(12) United States Patent
Ogura et al.

(10) Patent No.: US 8,826,180 B2
(45) Date of Patent: Sep. 2, 2014

(54) IMAGE DISPLAY APPARATUS AND IMAGE DISPLAY METHOD

(75) Inventors: Tomotaka Ogura, Tokyo (JP); Tetsuo Morimoto, Kanagawa (JP); Shunichi Kasahara, Kanagawa (JP)

(73) Assignee: Sony Corporation, Tokyo (JP)

( * ) Notice: Subject to any disclaimer, the term of this patent is extended or adjusted under 35 U.S.C. 154(b) by 287 days.

(21) Appl. No.: 13/050,432

(22) Filed: Mar. 17, 2011

(65) Prior Publication Data

US 2011/0234633 A1 Sep. 29, 2011

(30) Foreign Application Priority Data

Mar. 26, 2010 (JP) ................................ 2010-073066

(51) Int. Cl.
*G06F 3/048* (2013.01)
*G06F 3/0485* (2013.01)
*G06F 3/0354* (2013.01)
*G06F 3/01* (2006.01)

(52) U.S. Cl.
CPC ...... *G06F 3/0485* (2013.01); *G06F 2203/0339* (2013.01); *G06F 3/03547* (2013.01)
USPC ........... 715/828; 715/802; 715/811; 715/821; 715/831; 715/863

(58) Field of Classification Search
USPC .................. 715/863, 802, 811, 821, 828, 831
See application file for complete search history.

(56) References Cited

U.S. PATENT DOCUMENTS

| | | | | |
|---|---|---|---|---|
| 6,618,063 | B1* | 9/2003 | Kurtenbach ................... | 715/834 |
| 6,915,492 | B2* | 7/2005 | Kurtenbach et al. .......... | 715/810 |
| 7,898,529 | B2* | 3/2011 | Fitzmaurice et al. ......... | 345/173 |
| 2004/0008191 | A1* | 1/2004 | Poupyrev et al. ............. | 345/184 |
| 2008/0211779 | A1* | 9/2008 | Pryor ............................ | 345/173 |
| 2008/0282158 | A1* | 11/2008 | Aaltonen et al. .............. | 715/700 |
| 2009/0117943 | A1* | 5/2009 | Lee et al. ...................... | 455/566 |
| 2009/0267908 | A1* | 10/2009 | Wu et al. ....................... | 345/173 |
| 2010/0005390 | A1* | 1/2010 | Bong ............................. | 715/702 |
| 2010/0128002 | A1* | 5/2010 | Stacy et al. ................... | 345/174 |
| 2010/0130257 | A1* | 5/2010 | Jang .............................. | 455/566 |
| 2010/0271312 | A1* | 10/2010 | Alameh et al. ................ | 345/173 |

FOREIGN PATENT DOCUMENTS

| | | |
|---|---|---|
| JP | 11-355617 | 12/1999 |
| JP | 2005-020070 | 1/2005 |

* cited by examiner

*Primary Examiner* — Nicholas Augustine
(74) *Attorney, Agent, or Firm* — Wolf, Greenfield & Sacks, P.C.

(57) ABSTRACT

An image display apparatus includes: a storage section for storing a plurality of content items sorted using categories of a higher level; a display section for displaying either of the content items or the categories; an operating section generating a first operation signal according to a first operation performed with a weak pressing force and a second operation signal according to a second operation performed with a pressing force stronger than that of the first operation; and a control section receiving the input of the first operation signal and the second operation signal and controlling a display image displayed on the display section.

20 Claims, 9 Drawing Sheets

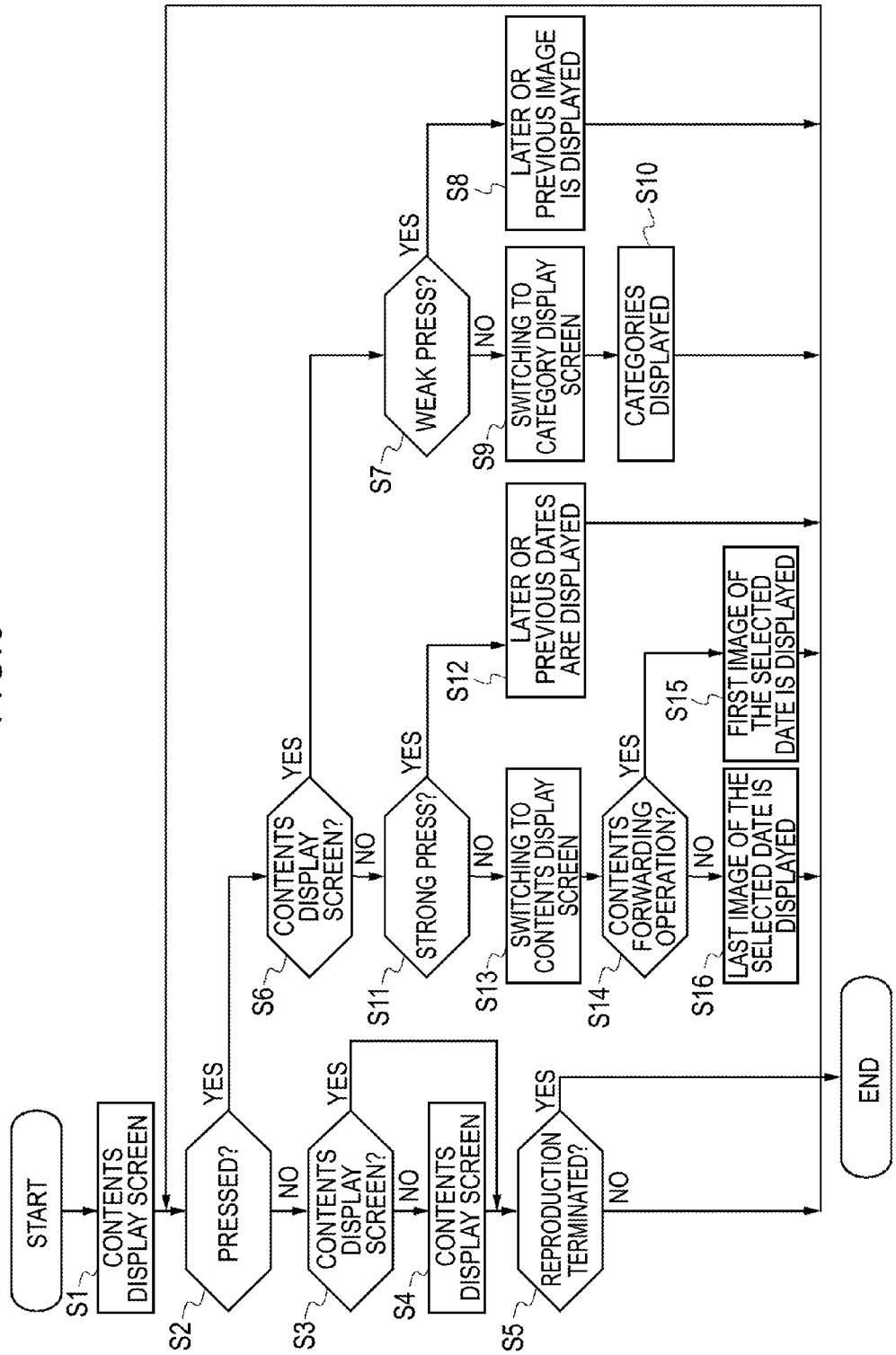

IMAGE DISPLAY APPARATUS AND IMAGE DISPLAY METHOD

BACKGROUND OF THE INVENTION

1. Field of the Invention

The present invention relates to an image display apparatus and an image display method used for retrieving a desired content item such as an image among various images obtained by imaging objects.

2. Description of the Related Art

Imaging apparatus (digital still cameras and digital video cameras) capable of imaging still images and moving images and recording the images in recording media as digital data have widely spread. Recently, as the capacity of recording media increases, it is becoming increasingly common to accumulate a great amount of image data in a recording medium incorporated in an imaging apparatus. As a result, demands have arisen for an effective way for retrieving a desired item of image data from among a great amount of image data.

The invention can be applied not only to images obtained by imaging objects but also to contents. The term "contents" means a collection of information as a whole which can be accessed by people in a web site or web medium. Specifically, contents may include images obtained by imaging objects, music, movies, texts, cartoons, games, and web pages. Therefore, the term "contents" will be used in the following description as a generic term meaning items of information including imaged images as listed above.

For example, there is a method of finding a content item of interest by forwarding and reversing (scrolling) a contents display screen. The content item of interest can be reached more quickly by adjusting the speed of forwarding and reversing. For example, a digital camera disclosed in JP-A-11-355617 (Patent Document 1) employs a pressure sensitive touch panel which allows the speed of forward and reversing to be changed depending on the pressure applied to the same. According to this method, speed adjustment can be carried out using only a forward/reverse button displayed on a screen without displaying a button for speed adjustment separately, which allows effective use of a screen. Further, since the operation utilizes a pressing force which is increased and decreased by a user, the user can use his or her feeling for the operation.

However, the approach involving only forwarding and reversing is insufficient for finding a content item of interest from among a great amount of contents. For example, a user may regard a plurality of content items as collectively forming one unit of information (which may alternatively be referred to as "category" as occasion demands) based on, for example, a shooting date. Categorized groups of contents are sorted according to a certain rule, e.g., the order in which the contents have been imaged or recorded. When a content item of interest is not included in contents having the same date stamp which are currently viewed, it is desirable for most users to move to contents of the next day by a one-step operation. The apparatus disclosed in Patent Document 1 cannot satisfy such demands.

JP-2005-20070 (Patent Document 2) discloses an approach for retrieval of a desired content item including the step of displaying a screen showing a list of contents of a month on a touch panel. When any of dates shown on the list is selected, the screen is switched to a screen showing a list of dated contents accompanied by reduced images arranged accordingly, to allow the user to select a desired content item from the list.

SUMMARY OF THE INVENTION

When a date is selected from a list of dated contents shown on an imaging apparatus according to Patent Document 2, the operation involves two steps, i.e., the step of pressing the position of the screen where the identification image of interest is shown and the step of pressing a confirmation button to confirm the selection of the date. Those steps are required to prevent the screen from being switched to a screen showing contents of a day as a result of an erroneous date selecting operation. The plurality of operational steps required for switching a list of dated contents to a list of contents of a day as thus described is problematic in that the approach results in low operability.

Further, the approach has two problems because it involves the step of simply switching the two different lists.

(1) When a list of contents of a day is switched to a list of dated contents after the first half of the list of contents of a day is searched, the second half of the list of the day cannot be viewed. In case that a content item of interest is included in the second half, the content item of interest will be missed.

(2) When a list of dated contents is switched to a list of contents of a day, the first content item of a plurality of sorted content items of the day is displayed. It is not known whether a content item of interest is included in the contents of the day until the entire contents of the day are checked by performing a contents forward/reversing operation after the displayed list is switched.

It is therefore desirable to provide an image display apparatus and an image display method which allow a desired content item to be retrieved by a pressing operation which advantageously utilizes a user's feeling and which includes a small number of operational steps.

It is also desirable to provide an image display apparatus and an image display method which allow a desired content item to be easily retrieved by displaying a transient screen when a transition takes place between a category display screen and a contents display screen takes place.

According to an embodiment of the invention, there is provided an image display apparatus including a storage section for storing a plurality of content items sorted using categories of a higher level, a display section for displaying either of the content items or the categories, an operating section generating a first operation signal according to a first operation performed with a weak pressing force and a second operation signal according to a second operation performed with a pressing force stronger than that of the first operation, and a control section receiving the input of the first operation signal and the second operation signal and controlling a display image displayed on the display section. The control section controls the storage section and the display section such that the contents displayed on a contents display screen displayed at the display section are sequentially switched when the first operation is performed; desired categories on a list of the categories displayed on a category display screen displayed at the display section are sequentially switched when the second operation is performed; a transition from the contents display screen to the category display screen takes place when the second operation is performed while the contents display screen is displayed; and a transition from the category display screen to the contents display screen takes place when the first operation is performed while the category display screen is displayed.

According to another embodiment of the invention, there is provided an image display method including the steps of sorting a plurality of content items using categories of a higher level, displaying either of the content items or the categories on a display section, generating a first operation signal according to a first operation performed with a weak pressing force and a second operation signal according to a second operation performed with a pressing force stronger than that of the first operation, and inputting the first operation signal and the second operation signal to a control section controlling a display image displayed on the display section. The control section exercises control such that: the contents displayed on a contents display screen displayed at the display section are sequentially switched when the first operation is performed; desired categories on a list of the categories displayed on a category display screen displayed at the display section are sequentially switched when the second operation is performed; a transition from the contents display screen to the category display screen takes place when the second operation is performed while the contents display screen is displayed; and a transition from the category display screen to the contents display screen takes place when the first operation is performed while the category display screen is displayed.

Preferred modes of the embodiments of the invention are as follows.

The operating section generates different operation signals associated with switching directions in which the contents and the categories are sequentially switched, and first, second, third and fourth operation signals are generated as combinations of the pressing forces and the switching directions.

The contents display screen is a screen displaying the contents substantially throughout a screen of the display section, and the category display screen is a screen displaying a plurality of the categories on the screen of the display section simultaneously.

A first transient screen intervenes when the transition from the contents display screen to the category display screen takes place, the first transition screen displaying content items which belong to the same category as the contents displayed on the contents display screen and which have not been displayed yet.

A second transient screen intervenes when the transition from the category display screen to the contents display screen takes place, the second transient screen displaying all content items belonging to categories selectable on the category display screen.

A first transient screen intervenes when the transition from the contents display screen to the category display screen takes place, the first transition screen displaying content items which belong to the same category as the contents displayed on the contents display screen and which have not been displayed yet, and a second transient screen intervenes when the transition from the category display screen and the contents display screen takes place, the second transient screen displaying all content items belonging to categories selectable on the category display screen.

The embodiments of the invention have the following advantages.

When forwarding or reversing contents sorted according to a certain hierarchical relationship such as a relationship between dates and contents of a day, the object of the operation is decided by increasing or decreasing a pressing force used for the operation. Specifically, when a transition to a category display screen is to take place or when categories shown on the category display screen are to be switched, a strong pressing force is used. When a transition to a contents display screen is to take place or when content displayed on the contents display screen is to be switched to another, a weak pressing force is used. The different pressing forces used for the operation correspond to speeds of retrieval of contents, and a user can operate the operation using his or her feeling.

Since displayed contents are switched by changing the magnitude of the pressing force, switching can be carried out faster when compared to a switching operation having a plurality of steps.

Further, when a category display screen such as a dates list display screen is changed to a contents display screen, a transient screen providing an overview of all content items included in the selected category intervene between the switched screens. It is therefore possible to determine whether a content item of interest is included in the category or not quickly.

Further, when the contents display screen is switched to the category display screen, a screen showing a list of content items in the category which have not been displayed intervenes the switched screens. It is therefore possible to prevent a content item of interest from being missed.

BRIEF DESCRIPTION OF THE DRAWINGS

FIG. 8 is a flow chart for explaining an exemplary flow of processes of the embodiment of the invention;

DESCRIPTION OF THE PREFERRED EMBODIMENTS

Embodiments of the invention will now be described. The following items will be described in the order listed.

<1. First Embodiment of the Invention>

<2. Another Embodiment of the Invention>

<3. Modifications>

Embodiments described below serve as preferred specific examples of the invention and, although they are accompanied by various preferred limitations in terms of the technical viewpoint, the scope of the invention described below is not limited to these embodiments unless otherwise specified to restrict the invention especially.

1. First Embodiment of the Invention

[Imaging Apparatus]

Figure 1:
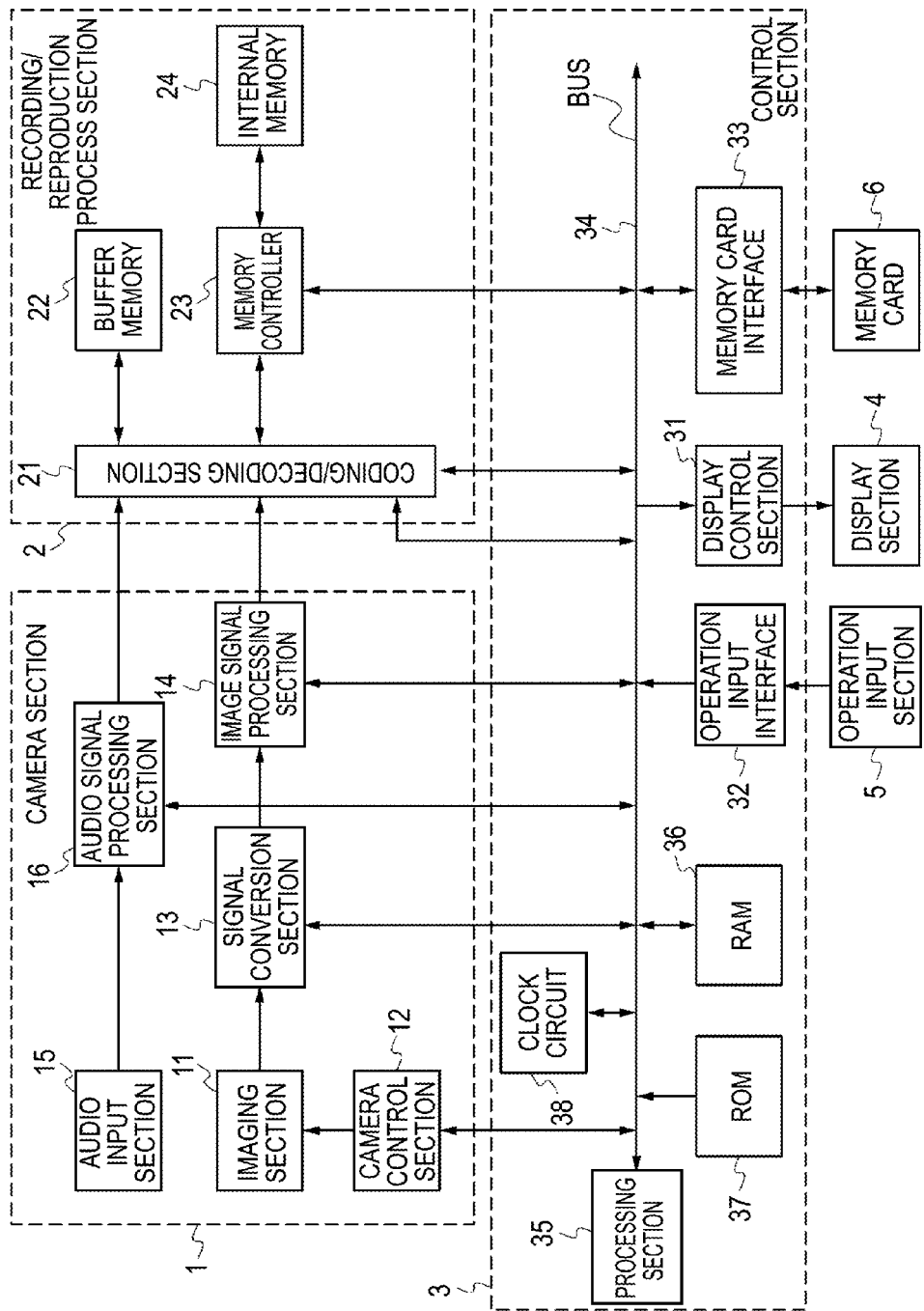
FIG. 1 is a block diagram of an imaging apparatus according to an embodiment of the invention.

An imaging apparatus according to an embodiment of the invention will be described with reference to FIG. 1. The imaging apparatus includes a camera section 1, a recording/reproduction process section 2, and a control section 3. A display section 4, an operation input section 5, and a memory card 6 which is a removable recording medium are connected to the control section 3. For example, the display section 4 is an LCD (liquid crystal display). A hard disk device, an optical recording medium such as a recordable DVD (digital versatile disc) or a recordable CD (compact disc), or a magnetic disc may be used instead of the memory card 6.

The control section 3 includes a display control section 31, and signals for controlling display operations of the display section 4 are generated by the display control section 31. The display control section 31 generates image signals to be displayed on the display section 4 from image data supplied through a bus 34 and supplies the image signals to the display section 4 to display images. Further, texts such as menus and graphics can be displayed on a screen of the display section 4 under control exercised by a processing section 35 and the display control section 31. Images are displayed in a mode which is in accordance with a display processing program recorded in a ROM 37.

The control section 3 includes an operation input interface 32, and operation signals according to user operations input from the operation input section 5 are supplied to the bus 34 of the control section 3 through the operation input interface 32. The control section 3 also includes a memory card interface 33, and the memory card 6 is inserted into a connector of the memory card interface 33, whereby signals are transmitted and received between the memory card 6 and the control section 3 through the memory card interface 33.

The operation input section 5 includes a pressure sensitive input device, various buttons such as a shutter release button, a lever, and a dial. The pressure sensitive input device generates a first operation signal according to a first operation that is an operation with a weak pressing force and a second operation signal according to a second operation with a pressing force stronger than that of the first operation. The display section 4 is constituted by a touch panel to allow a user to perform input operations by pressing the screen with a finger or a pointer. The pressure sensitive input device may be formed as a part of the touch panel.

In the control section 3, the processing section 35 which is constituted by a CPU (central processing unit), a RAM (random access memory) 36, a ROM (read only memory) 37, and a clock circuit 38 are connected through the bus 34. Various parts of the imaging apparatus are controlled by the control section 3. The RAM 36 is primarily used as a work area for purposes such as temporarily storing interim results of processes. The ROM 37 is used for storing various programs to be executed by the processing section 35 and data required for processes. The clock circuit 38 provides information such as the present date, the present day of the week, the present time, and shooting dates, and the circuit also has the function of attaching date/time information such as shooting date and time to a photographic image file.

The camera section 1 has an imaging section 11 including an optical block and an imager. The optical block includes a lens, a focus mechanism, a shutter mechanism, and an iris mechanism. The imager may be a CCD (charge coupled device), a CMOS (complementary metal oxide semiconductor) imager, or the like.

When photographing an object, a camera control section 12 generates a drive signal for driving the optical block of the imaging section 11 under control exercised by the control section 3. The focus mechanism, the shutter mechanism, and the iris mechanism of the optical block are controlled by the drive signal from the camera control section 12 to acquire an object image, and the object image is supplied to the imager.

The imager performs photoelectric conversion of the object image from the optical block and outputs a resultant signal. The imager operates according to the drive signal from the camera control section 12 to acquire an object image, and the image of an object thus acquired is supplied to a signal conversion section 13 as an electric signal.

The signal conversion section 13 performs a CDS (correlated double sampling) process on the imaging signal supplied to the same to improve the S/N ratio of the signal, performs an AGC (automatic gain control) process to control the gain, and performs A-D conversion to generate imaging data which is a digital signal.

The digital imaging data is supplied from the signal conversion section 13 to an image signal processing section 14. The image signal processing section 14 performs camera signal processing such as AF (auto focus), AE (auto exposure), and AWB (auto white balance) on the imaging data. After receiving the camera signal processing, the image data is supplied to a coding/decoding section 21 of the recording/reproduction process section 2.

The camera section 1 includes an audio input section (microphone) 15. Audio signals from an audio input section 15 are supplied to an audio signal processing section 16. The audio signal processing section 16 is formed by an amplifier, an A-D converter, and the like. The audio signal processing section 16 amplifies an audio signal collected by the audio input section 15 and converts the signal into a digital signal. A compression process may be performed on an audio signal at the audio signal processing section 16. The digital audio signal from the audio signal process section 16 is supplied to the coding/decoding section 21 of the recording/reproduction process section 2. Although not shown, an audio reproduction apparatus such as a speaker is provided for reproducing an audio signal from a recording medium.

The coding/decoding section 21 of the recording/reproduction process section 2 performs compression coding of video signals from the image signal processing section 14 and audio signals from the audio signal processing section 16. For example, still image data are compression-coded according to the JPEG (Joint Photographic Experts Group) standard, and moving image data are compression-coded according to the MPEG2 (Moving Picture Experts Group Phase 2) standard. Further, audio data are compressed according to the MP3 (MPEG1 Audio Layer 3) standard. A buffer memory 22 is provided with association with the coding/decoding section 21.

Image data and audio data compressed by the coding/decoding section 21 are supplied to an internal memory 24, which may be a hard disc, non-volatile memory, or the like through a memory controller 23 and stored in the memory. Further, the compressed image data and audio data are supplied to the memory card 6 through the bus 34 and the memory card interface 33 under control exercised by the control section 3 and stored in the memory card. The compressed data are stored in the recording medium as an image file in compliance with a predetermined standard, e.g., the DCF (Design rule for Camera File system).

Data read from an internal memory 24 or the memory card 6 are decoded by the coding/decoding section 21. Decoded image data are supplied to the display section 4 through the display control section 31 and displayed on the display section under control exercised by the control section 3. An image under imaging in progress may be also displayed on the display section 4.

Operations of the above-described imaging apparatus will now be schematically described. A signal obtained by photoelectrically converting light at the imager of the imaging section 11 is supplied to the signal conversion section 13. The CDS process and the AGC process are performed on the signal to convert it into a digital signal which is then supplied to the image signal processing section 14. An image quality correcting process is performed on the image data at the image signal processing section 14, and the resultant data are supplied to the control section 3 as image data of a camera-through image. The image data input to the control section 3 are supplied to the display control section 31 to display the camera through image on the display section 4. Angle-of-view adjustment can be carried out based on the view of the image displayed on the display section 4.

When the shutter release button of the operation input section 5 is depressed, the processing section 35 outputs a control signal to the camera control section 12 to cause a shutter of the imaging section 11 to operate. At the same time, one frame's worth of image data supplied from the signal conversion section 13 are processed by the image signal processing section 14, and the resultant data are thereafter stored in the buffer memory 22. Further, the image data are compression-coded by the coding/decoding section 21. The coded data are supplied to the internal memory 24 through the memory controller 23 and stored in the memory. The data are also supplied to the memory card 6 through the system bus 34 and the memory card interface 33 and stored in the memory card.

An audio signal collected by the audio input section 15 and supplied to the audio signal processing section 16 are converted into a digital signal which is then subjected to a compression coding process. Further, the coded audio data obtained by the process at the processing section 35 are stored in the internal memory 24 and the memory card 6.

The processing section 35 acquires the shooting date and time from the clock circuit 38, adds them to the still image data or the audio data, and stores the data in the internal memory 24 and the memory card 6. Further, in the case of the still image data, reduced image data of the still image is created and stored in the internal memory 24 and the memory card 6 in association with the original still image data.

Referring to reproduction of image data stored in the internal memory 24 or the memory card 6, image data selected by the processing section 35 according to an operation input from the operation input section 5 are read out from the internal memory 24 or the memory card 6 and supplied to the buffer memory 22. The data are decoded by the coding/decoding section 21. The decoded image data are supplied to the display section 4 through the display control section 31 to display a reproduction image on the display section 4. Audio data are similarly decoded and reproduced by an audio reproduction apparatus.

The number of content items recorded in the above-described imaging apparatus increases with an increase of the storage capacity of the internal memory 24 or the memory card 6, and it will consequently take a longer time for a user to find a desired content item. However, the embodiment of the invention makes it possible to find a content item of interest simply and quickly from a great amount of contents.

[Pressure Sensitive Input Device]

Figure 2:
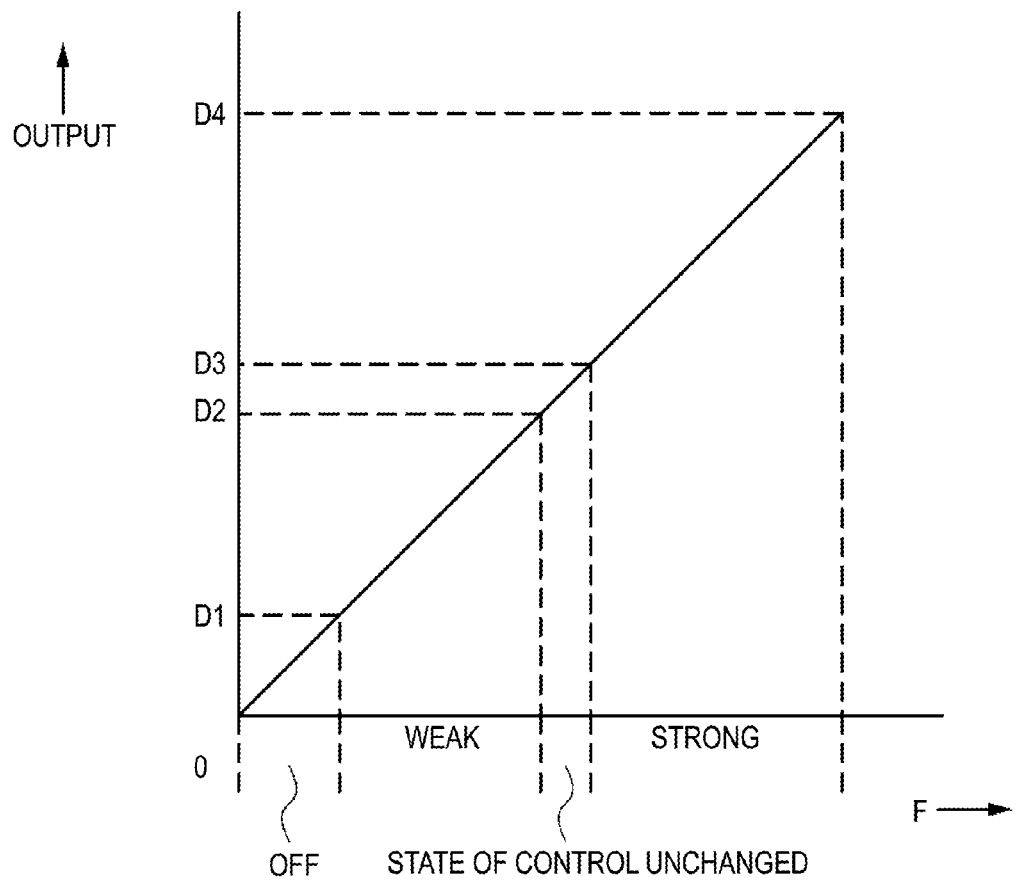
FIG. 2 is a schematic graph for explaining a pressure sensitive input device of the embodiment of the invention.

The pressure sensitive input device provided at the operation input section 5 is, for example, a switch formed using pressure sensitive conductive rubber, and the resistance of the device changes according to a pressing force F applied thereto by a finger or a stylus pen when a user operates the device. The device generates a digital output having a magnitude in accordance with the resistance as shown in FIG. 2. When the pressing force is very weak, the input device is regarded as residing in a non-operating (OFF) domain. A domain corresponding to an output in a range from D1 to D2 is defined as a weak pressing force domain. A domain corresponding to an output in a range from D3 to D4 is defined as a strong pressing force domain. A domain corresponding to an output in a range from D2 to D3 is defined as a domain where the magnitude of the pressing force is not determined. In this non-determined domain, the pressure sensitive input device is determined as non-operating just as it is in the OFF domain, and the current state of control is kept unchanged. What is shown in FIG. 2 is general characteristics of the device, and the device may alternatively have non-linear output characteristics or characteristics having a slope that is the reverse of the slope shown in FIG. 2.

The digital output generated by the pressure sensitive input device as described above is supplied from the operation input interface 32 to the processing section 35 through the bus 34. Further, the pressure sensitive input device has two separate regions to be operated, and an operation signal is generated in association with an operation performed on each of the regions. As will be described later, the regions function as a forwarding switch and a reversing switch. Therefore, the pressure sensitive input device generates operation signals associated with magnitudes of the pressing force and forwarding/reversing. When an operation signal is supplied, the processing section 35 determines the digital output against thresholds to make determinations concerning the OFF state, the non-determined state, the pressing force, and forwarding/reversing.

[Screen Display]

Figure 3:
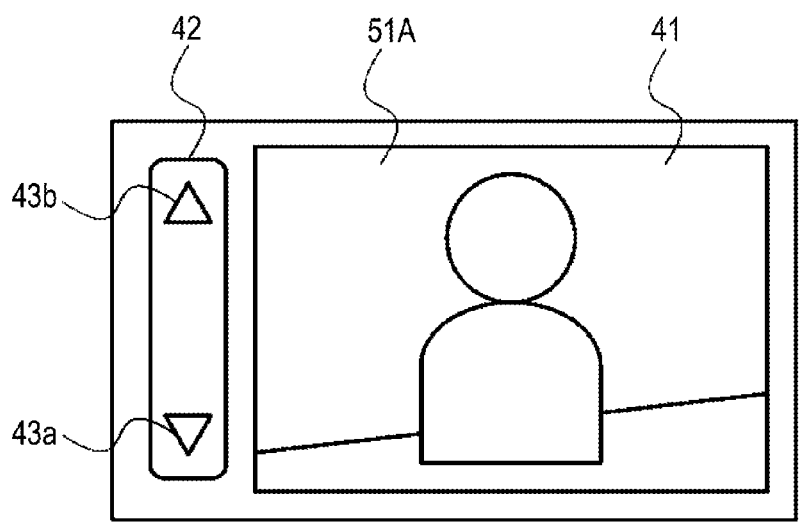
FIG. 3 is a schematic illustration for explaining a contents display screen of the embodiment of the invention.
Figure 4:
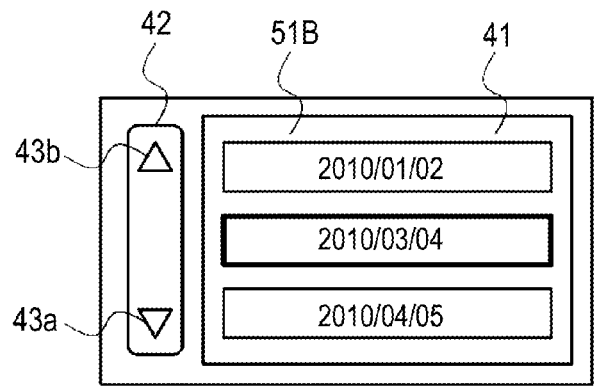
FIG. 4 is a schematic illustration for explaining a category display screen of the embodiment of the invention.

As shown in FIGS. 3 and 4, a screen 41 of the display section 4 and a pressure sensitive input device 42 are provided on the back side of the case of the imaging apparatus. The pressure sensitive input device 42 has a bottom region for generating an operation signal of a "forwarding" direction (the region will be hereinafter referred to as "forwarding switch 43*a*" as occasion demands) and a top region for generating an operation signal of a "reversing" direction (the region will be hereinafter referred to as "reversing switch 43*b*" as occasion demands). Therefore, the pressure sensitive input device 42 generates four types of operation signals which are combinations of types of switches pressed and magnitudes of the pressing force.

When the imaging apparatus is in a reproduction mode, the apparatus can display either a contents display screen 51A as shown in FIG. 3 or a category display screen 51B as shown in FIG. 4. The contents display screen 51A is a screen displayed throughout the screen 41 showing a content item such as a recorded image. The recorded image is stored, for example, in the internal memory 24. When an object being imaged is displayed in an imaging mode of the apparatus, the image is displayed throughout the screen in the same way as the contents display screen 51A is displayed.

The contents display screen 51A shows a particular content item substantially throughout the display area of the display device. When the forwarding switch 43*a* or the reversing switch 43*b* of the pressure sensitive input device 42 is pressed by the weak pressing force while the content display screen 51A is displayed, content items are sequentially displayed in the direction associated with the switch pressed. Specifically, data of contents of the same imaging date are sorted in advance in the order of oldness of imaging times. When the forwarding switch 43*a* is pressed, the content items are displayed in the old-to-new direction of the imaging times (forward selecting direction). On the contrary, when the reversing switch 43b is pressed, the contents are displayed in the new-to-old direction of the imaging times (reverse selecting direction).

The category display screen 51B is a screen on which certain categories, e.g., imaging dates (which may be icons referred to as "labels" representing dates) are displayed in a columnar arrangement in the time-sequential order. Labels of a plurality of categories are simultaneously displayed on the category display screen 51B. The label of a category in a selected state among the labels of the plurality of categories is displayed differently from the labels of unselected categories. For example, the frame of the label displaying a certain date may be highlighted.

When the forwarding switch 43a or the reversing switch 43b of the pressure sensitive input device 42 is pressed by the strong pressing force while the category display screen 51B is displayed, the labels of categories displayed are sequentially switched in the direction associated with the switch pressed. For example, the labels of dates are scrolled in the direction associated with the switch pressed. When a predetermined time passes after scrolling is stopped, the date shown in the middle of the screen is selected. That is, the labels of imaging dates are sorted in the old-to-new order of the dates. A date shown on the screen 41 is newer, the closer the date is to the bottom of the screen. When the forwarding switch 43a is pressed, the labels of dates are moved in the direction of revealing newer dates (in the forward selecting direction or upward in the screen). On the contrary, when the reversing switch 43b is pressed, the labels of dates are moved in the direction of revealing older dates (in the reverse direction or downward in the screen).

Figure 5:
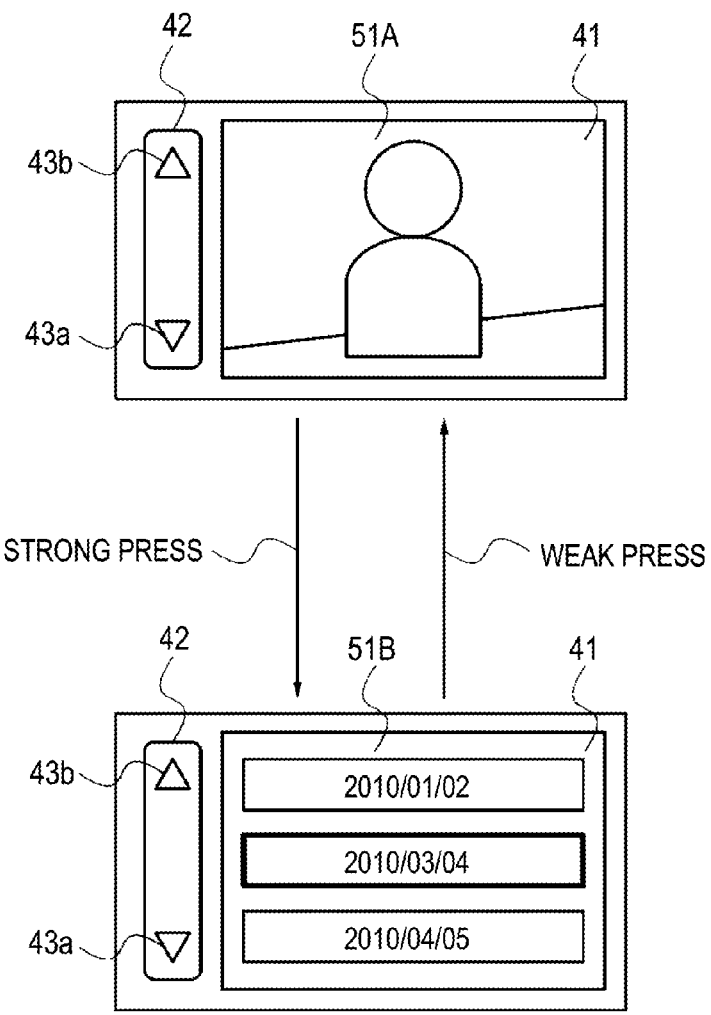
FIG. 5 is a schematic illustration for explaining transitions between the contents display screen and the category display screen of the embodiment of the invention.

When the pressure sensitive input device 42 is pressed by the strong pressing force while the contents display screen 51A is displayed as shown in FIG. 5, a transition to the category display screen 51B takes place. On the contrary, when the pressure sensitive input device 42 is pressed by the weak pressing force while the category display screen 51B is displayed, a transition to the contents display screen 51A takes place. The magnitude of the pressing force can be changed by either changing the force while continuously pressing the pressure sensitive input device 42 or temporarily releasing the finger from the pressure sensitive input device 42 and pressing the device again with the pressing force changed. As thus described, the pressure sensitive input device 42 is strongly pressed for switching categories and causing a transition to the category display screen. Since switching categories means switching contents at a high speed, correspondence between the magnitude of the pressing force and the switching speed agrees with the feeling that a user has during the operation. Thus, the apparatus has high operability.

[Screen Transition]

Figure 6:
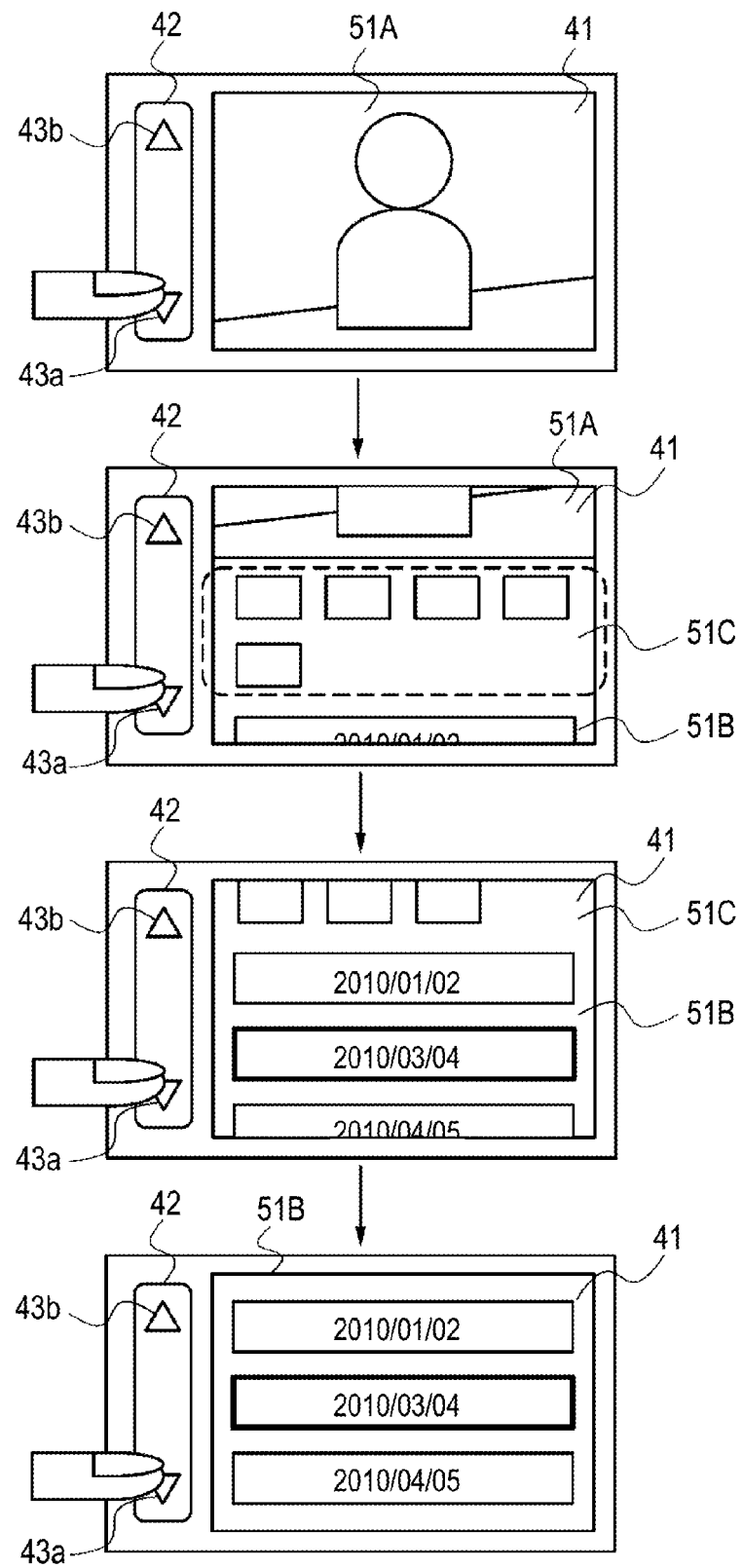
FIG. 6 is a schematic illustration for explaining a transition from the contents display screen and the category display screen of the embodiment of the invention.

A description will now be made with reference to FIG. 6 on a screen transition which takes place when the contents display screen 51A is switched to the category display screen 51B. A first transient screen intervenes between the display screens. The first transient screen displays contents which belong to the same category as the contents displayed on the contents display screen 51A and which have not been displayed yet. That is, when some content items of the same date as the contents displayed throughout the screen have not been displayed yet, a list display screen 51C showing a list of such content items intervenes when switching from the contents display screen 51A to the category display screen 51B takes place. The list display screen 51C shows a reduced image of each content item.

One screen is switched to another by scrolling the screen. For example, the screen is scrolled upward when the forwarding switch 43a is pressed and scrolled downward when the reversing switch 43b is pressed. The screen is scrolled at such a speed that the reduced images included in the list display screen 51C can be discriminated. When a user stops viewing contents of a day with some of the contents left unviewed to switch the screen to the category display screen 51B for selecting a later date, the list display screen 51C allows the remaining contents of the same day to be checked. It is therefore possible to prevent contents from being missed at the time of date switching.

Contents to be displayed as reduced images on the list display screen 51C are decided as described below. When a user presses the forwarding switch 43a stronger during a forwarding operation performed by pressing the forwarding switch 43a as shown in FIG. 6, the screen is switched to the category display screen 51B for selecting a later date. In this case, contents belonging to the same day as the presently displayed contents and imaged later than the displayed contents are displayed on the list display screen 51C. When the reversing switch 43b is pressed stronger during a reversing operation performed by pressing the reversing switch 43b, the screen is switched to the category display screen 51B for selecting a previous date. In this case, contents belonging to the same day as the presently displayed contents and imaged earlier than the displayed contents are displayed on the list display screen 51C.

A description will now be made with reference to FIG. 7 on a screen transition which takes place when the category display screen 51B is switched to the contents display screen 51A. When the pressing force applied to the pressure sensitive input device 42 is weakened while the category display screen 51B is displayed, the screen is switched to the contents display screen 51A. At this time, an overview display screen 51D which is a second transient screen displaying all content items of a selected date intervenes the switching from the category display screen 51B to the contents display screen 51A takes place. The overview display screen 51D allows the outline of the contents of the selected date to be checked easily. One screen is switched to another by scrolling the screen. For example, the screen is scrolled upward when the forwarding switch 43a is pressed and scrolled downward when the reversing switch 43b is pressed. The screen is scrolled at such a speed that reduced images included in the overview display screen 51D can be discriminated.

Figure 7:
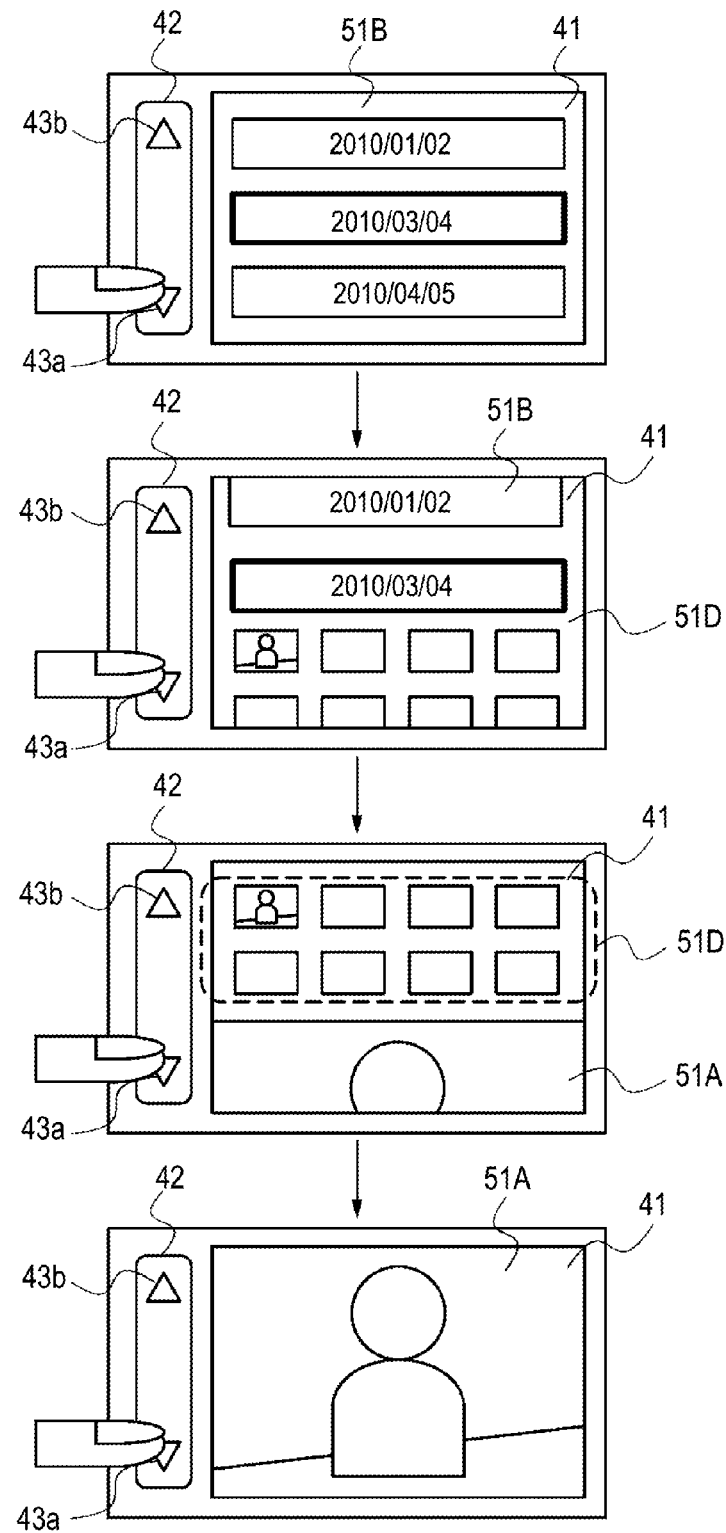
FIG. 7 is a schematic illustration for explaining a transition from the category display screen to the contents display screen of the embodiment of the invention.
Figure 9A:
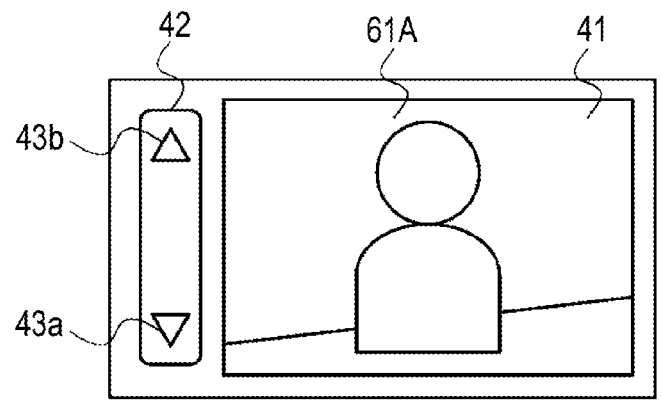
FIGS. 9A to 9D are schematic illustrations for explaining display screens according to another embodiment of the invention.
Figure 9B:
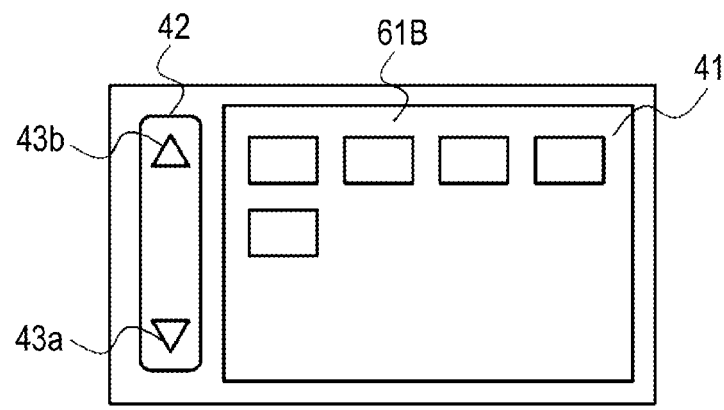
Figure 9C:
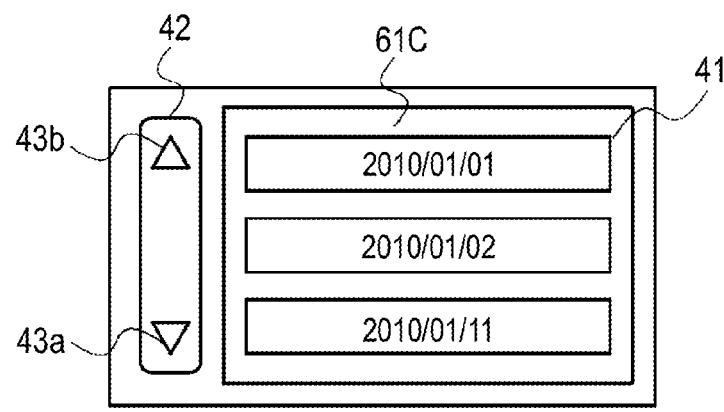
Figure 9D:
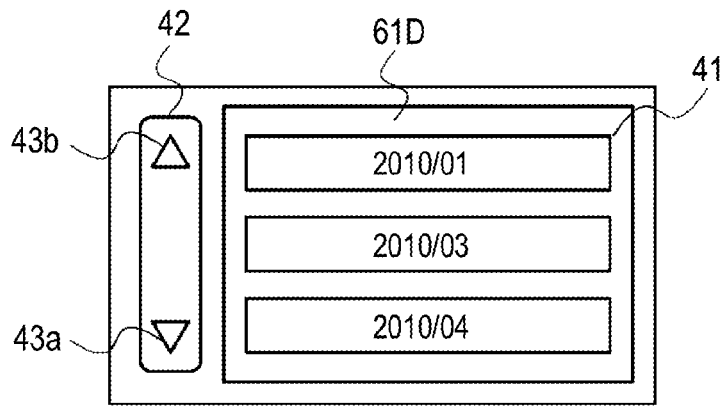

In the example shown in FIG. 7, when the force pressing the forward switch 43a is weakened while a date label "Mar. 4, 2010" on the category display screen 51B is selected, the screen is scrolled upward to display the overview display screen 51D showing reduced images representing all contents of the day. Then, a transition takes place to display the contents display screen 51A showing the first content item of the selected date throughout the screen of the apparatus. Such an overview display screen 51D similarly intervenes when the category display screen 51B is switched to the contents display screen 51A by weakening the pressing force applied to the reversing switch 43b. In this case, the last content item of a selected date is displayed throughout the screen. The overview display screen 51D allows the outline of contents of a selected date to be easily checked.

[Flow of Processes of the Embodiment]

A flow of processes performed in the embodiment of the invention under control exercised by the control section 3 will now be described with reference to the flow chart shown in FIG. 8. When a user operates a mode select switch or the like to enable the reproduction mode of the apparatus, an image is displayed throughout the screen (step S1). That is, the contents display screen 51A is displayed. For example, the first image displayed is an imaged which has been imaged and recorded most recently.

At step S2, it is determined whether the pressure sensitive input device 42 has bee pressed or not. If not, the process proceeds to step S3. At step S3, it is determined whether the current screen is the contents display screen or not. If it is determined that the current screen is not the contents display screen, an image is displayed at step S4, and the process proceeds to step S5. The process proceeds to step S5 also when it is determined at step S3 that a content item is being displayed.

At step S5, it is determined whether reproduction has been terminated or not. For example, the user may operate the mode select switch or the like to terminate the reproduction mode. If it is determined that reproduction has not been terminated, the process returns to step S2 at which it is determined whether the pressure sensitive input device 42 has been pressed or not.

When it is determined at step S2 that the pressure sensitive input device 42 has been pressed, it is determined at step S6 whether the current screen is the contents display screen or not. When it is determined that the current screen is the contents display screen, it is determined at step S7 whether the pressing force is weak or not. If it is determined that the pressing force is weak, the subsequent or preceding image of the same date as the currently displayed image is displayed at step S8. After step S8, the process returns to step S2.

When the forwarding switch 43a is weakly pressed, the image which has been imaged at the subsequent (next) imaging time is displayed. When the reversing switch 43b is weakly pressed, the image which has been imaged at the preceding imaging time is displayed. When the forwarding switch 43a is kept depressed weakly after the last image of a date is displayed on the contents display screen, the first image of the next date is displayed. When the reversing switch 43b is kept depressed weakly, the last image of the previous date is displayed.

When it is determined at step S7 that the pressing force is strong, a transition from the contents display screen to the category display screen takes place at step S9. As described above with reference to FIG. 6, the transition to the category display screen is preceded by the intervening the list display screen 51C showing a list of reduced images of images of the same date which have not been displayed yet. At step S10, the screen becomes the category display screen on which a date list is displayed.

When it is determined at step S6 that the category display screen is displayed, it is determined at step S11 whether the pressing force is strong or not. When the pressing force is determined to be strong, the categories (dates) are changed at step S12. The dates to be selected are changed to subsequent dates when the forwarding switch 43a is pressed, and the dates to be selected are changed to preceding dates when the reversing switch 43b is pressed. Then, the process returns to step S2.

When it is determined at step S6 that the category display screen is displayed and it is determined at step S11 that the pressing force is weak, a transition to the contents display screen takes place at step S13. As described above with reference to FIG. 7, the switching to the contents display screen is preceded by the intervenient overview display screen showing contents of the selected date.

At step S14, it is determined whether a contents forwarding operation is in progress or not. When the forwarding switch 43a is kept depressed for a contents forwarding operation, the first image of the selected date is displayed at step S15. When the reversing switch 43b is kept depressed for a contents reversing operation, the last image of the selected date is displayed at step S16. After the steps S15 and S16, the process returns to step S2.

<2. Another Embodiment of the Invention>

The above-described embodiment of the invention has a structure having two levels, i.e., the level of categories which are dates and the level of contents which are images belonging to the categories, respectively. Another embodiment of the invention has an exemplary structure including three levels. Specifically, the embodiment has categories which are months, intermediate categories which are dates, and contents which are images associated with the dates, respectively.

[Display Screen]

As shown in FIGS. 9A to 9D, a contents display screen 61A, a reduced image display screen 61B, a date display screen 61C, and a month display screen 61D are provided. The contents display screen 61A is a screen for displaying contents substantially throughout a screen just like the contents display screen of the first embodiment. The reduced image display screen shows a list of reduced images of all content items belonging to the same date or a list of reduced images of content items of the same data which have not been displayed yet. The date display screen 61C is a screen showing dates belonging to the same month and having contents (images) associated therewith. The month display screen 61D is a screen showing months having contents (images) associated therewith.

A user retrieves a desired content item by switching the contents display screen 61A and the month display screen 61D as a category display screen. A pressure sensitive input device 42 includes a forwarding switch 43a and a reversing switch 43b. Content items to be selected on the contents display screen 61A can be switched by pressing the pressure sensitive input device 42 weakly. Months to be selected on the month display screen 61D can be switched by pressing the pressure sensitive input device 42 strongly.

The reduced image display screen 61B and the date display screen 61C are screens displayed when screen transitions take place. A description will now be made with reference to FIG. 10 on a screen transition which takes place when the contents display screen 61A is switched to the month display screen 61D. When some contents of the same date as the contents displayed throughout the contents display screen 61A have not been displayed yet, the reduced image display screen 61B showing reduced images of such content items and the date display screen 61C showing a list of dates of the same month having content items associated therewith intervene when switching from the contents display screen 61A to the month display screen 61D takes place.

One screen is switched to another by scrolling the screen. For example, the screen is scrolled upward when the forwarding switch 43a is pressed and scrolled downward when the reversing switch 43b is pressed. When a user stops viewing contents of a month with some of the contents left unviewed to switch the screen to the month display screen 61D for selecting a later month, the reduced image display screen 61B and the date display screen 61C allow the remaining contents of the same month to be checked. It is therefore possible to prevent contents from being missed at the time of month switching.

Figure 10:
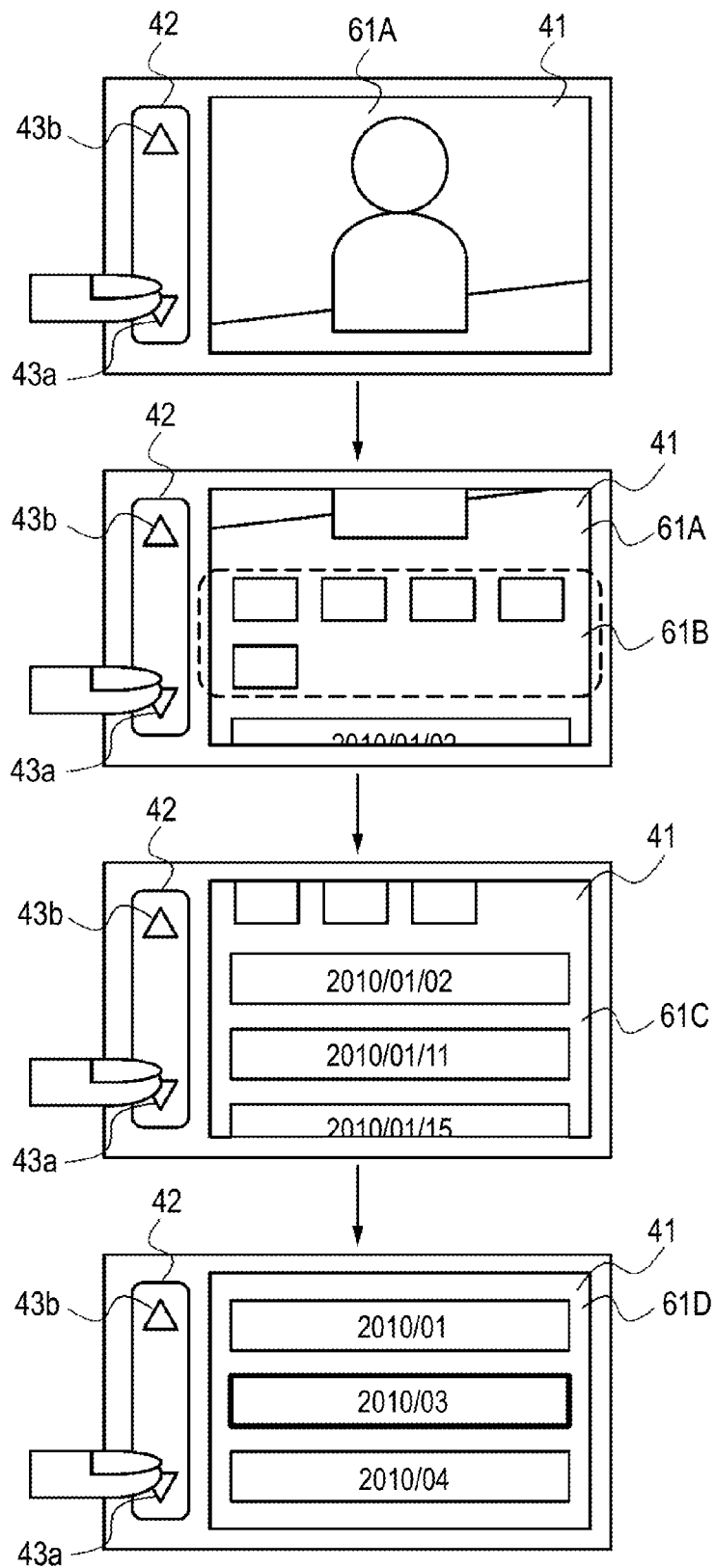
FIG. 10 is a schematic illustration for explaining a screen transition in the embodiment of the invention.

Contents to be displayed on the reduced image display screen 61B and the date display screen 61C are decided as follows. When a user presses the forwarding switch 43a stronger during a forwarding operation performed by pressing the forwarding switch 43a as shown in FIG. 10, the screen is switched to the month display screen 61D for selecting a later month. In this case, contents belonging to the same date as the presently displayed contents and imaged later than the displayed contents are displayed on the reduced display screen 61B. Further, a list of dates which belong to the same month as the presently displayed contents and which are later than the date of the presently displayed contents is displayed on the date display screen 61C.

When the reversing switch 43b is pressed stronger during a reversing operation performed by pressing the reversing switch 43b, the screen is switched to the month display screen 61D for selecting a previous month. In this case, contents belonging to the same day as the presently displayed contents and imaged earlier than the displayed contents are displayed on the reduced image display screen 61B. Further, a list of dates which belong to the same month as the month of the presently displayed contents and which are earlier than the dates of the presently displayed contents is displayed on the date display screen 61C.

Figure 11:
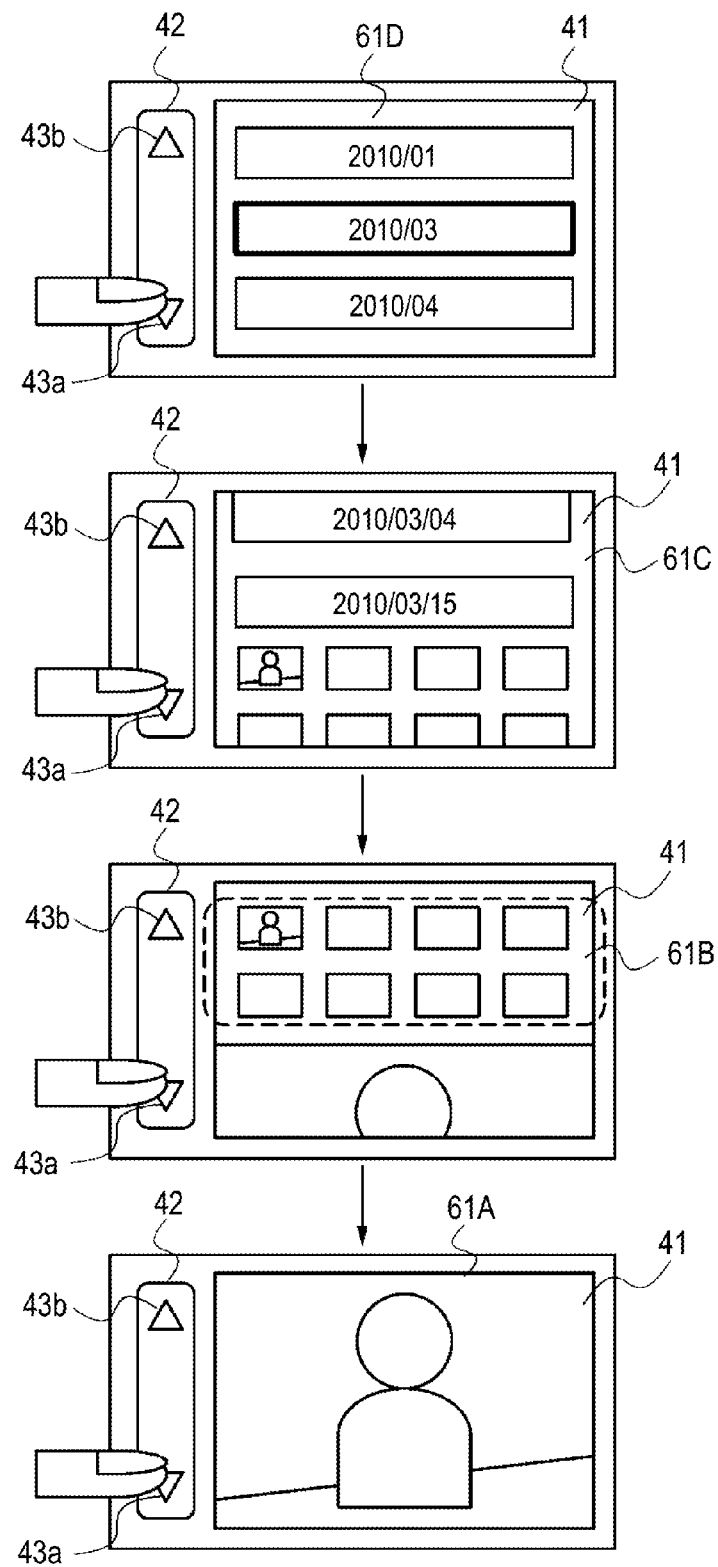
FIG. 11 is a schematic illustration for explaining another screen transition in the embodiment of the invention.

A description will now be made with reference to FIG. 11 on a screen transition which takes place when the month display screen 61D is switched to the contents display screen 61A. When the pressing force applied to the pressure sensitive input device 42 is weakened while the months display screen 61D is displayed, the screen is switched to the contents display screen 61A. At this time, the screen is scrolled to temporarily display the date display screen 61C showing a list of all dates belonging to the same month as the month of the presently displayed contents and having contents associated therewith and the reduced image display screen 61B showing reduced images of all content items belonging to the dates shown on the date display screen 61C. Then, the screen is switched to the contents display screen 61A. The reduced image display screen 61B and the date display screen 61C allow the outline of the contents of the selected month to be checked easily.

<3. Modifications>

Some embodiments of the invention have been specifically described above. The invention is not limited to the above-described embodiment, and various modifications may be made based on the technical principle of the invention. For example, recorded images may be categorized into certain genres (persons, scenes, and the like) instead of dates and months. Content according to the embodiment of the invention is not limited to still images, and the invention may be applied to moving images. For example, a moving image having divisions each of which has been recorded by one recording operation may constitute content. In the case of moving images, a reduced image of the image of the first scene of the each moving image is used on the list display screen and the overview display screen.

Content to which the embodiment of the invention can be applied is not limited to recorded images, and the embodiment of the invention may be applied to pieces of music. In the case of pieces of music, album names and artist names may be used as categories. Further, images such as icons allowing identification of categories may be used instead of texts as labels representing categories.

The present application contains subject matter related to that disclosed in Japanese Priority Patent Application JP 2010-073066 filed in the Japan Patent Office on Mar. 26, 2010, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image display apparatus comprising:
a storage section to store a plurality of content items sorted using categories of a higher level;
a display section to display either the content items in a contents display screen or the categories in a category display screen;
an operating section to generate a first operation signal according to a first operation performed with a first pressing force and a second operation signal according to a second operation performed with a second pressing force, the first and second pressing forces being different in magnitude; and
a control section to receive input of the first operation signal and the second operation signal and to control a display image displayed on the display section, wherein the control section controls the storage section and the display section such that:
when the contents display screen is displayed, the first operation causes the content items displayed at the display section to be sequentially switched without causing a transition to the category display screen, and the second operation causes a transition from the contents display screen to the category display screen, resulting in the categories being displayed on the display section instead of the content items; and
when the category display screen is displayed, the first operation causes a transition from the category display screen to the contents display screen, resulting in the content items being displayed on the display section instead of the categories, and the second operation causes the categories displayed at the display section to be sequentially switched without causing a transition to the contents display screen,
wherein a first transient screen intervenes when the transition from the contents display screen to the category display screen takes place and a second transient screen intervenes when the transition from the category display screen to the contents display screen takes place, the second transient screen being different from the first transient screen.

2. An image display apparatus according to claim 1, wherein:
the operating section generates different operation signals associated with switching directions in which the content items and the categories are sequentially switched; and
first, second, third, and fourth operation signals are generated as combinations of the pressing forces and the switching directions.

3. An image display apparatus according to claim 1 or 2, wherein:
the contents display screen is a screen displaying the contents substantially throughout a screen of the display section; and
the category display screen is a screen simultaneously displaying a plurality of the categories on the screen of the display section.

4. An image display apparatus according to claim 1, wherein the first transient screen displays content items which belong to a same category as the content items displayed on the contents display screen and which have not been displayed yet.

5. An image display apparatus according to claim 1, wherein the second transient screen displays all content items belonging to categories selectable on the category display screen.

6. An image display apparatus according to claim 3, wherein
the first transient screen displays content items which belong to a same category as the contents displayed on the contents display screen and which have not been displayed yet; and
the second transient screen displays all content items belonging to categories selectable on the category display screen.

7. An image display method comprising the steps of:
storing a plurality of content items using categories of a higher level;
displaying either the content items or the categories on a display section;
generating a first operation signal according to a first operation performed with a first pressing force and a second operation signal according to a second operation performed with a second pressing force, the first and second pressing forces being different in magnitude; and
inputting the first operation signal and the second operation signal to a control section controlling a display image displayed on the display section, the control section exercising control such that:
when the contents display screen is displayed, the first operation causes the content items displayed at the display section to be sequentially switched without causing a transition to the category display screen, and the second operation causes a transition from the contents display screen to the category display screen, resulting in the categories being displayed on the display section instead of the content items; and
when the category display screen is displayed, the first operation causes a transition from the category display screen to the contents display screen, resulting in the content items being displayed on the display section instead of the categories, and the second operation causes the categories displayed at the display section to be sequentially switched without causing a transition to the contents display screen,
wherein a first transient screen intervenes when the transition from the contents display screen to the category display screen takes place and a second transient screen intervenes when the transition from the category display screen to the contents display screen takes place, the second transient screen being different from the first transient screen.

8. An image display apparatus comprising:
a storage section to store a plurality of content items sorted using categories of a higher level;
a display section to display either the content items or the categories;
an operating section to generate a first operation signal according to a first operation performed with a first pressing force and a second operation signal according to a second operation performed with a second pressing force, the first and second pressing forces being different in magnitude; and
a control section to receive input of the first operation signal and the second operation signal and to control a display image displayed on the display section, wherein the control section controls the storage section and the display section such that:
when the contents display screen is displayed, the first operation causes the content items displayed at the display section to be sequentially switched without causing a transition to the category display screen, and the second operation causes a transition from the contents display screen to the category display screen, resulting in the categories being displayed on the display section instead of the content items; and
when the category display screen is displayed, the first operation causes a transition from the category display screen to the contents display screen, resulting in the content items being displayed on the display section instead of the categories, and the second operation causes the categories displayed at the display section to be sequentially switched without causing a transition to the contents display screen,
wherein a first transient screen intervenes when the transition from the contents display screen to the category display screen takes place and a second transient screen intervenes when the transition from the category display screen to the contents display screen takes place, the second transient screen being different from the first transient screen.

9. The image display apparatus of claim 8, wherein:
the display section displays the category display screen instead of the contents display screen when the second operation is performed while the contents display screen is displayed; and
the display section displays the contents display screen instead of the category display screen when the first operation is performed while the category display screen is displayed.

10. The image display apparatus of claim 4, wherein the transition from the contents display screen to the category display screen comprises scrolling from the contents display screen to the first transient screen then to the category display screen.

11. The method of claim 7, wherein the transition from the contents display screen to the category display screen comprises scrolling from the contents display screen to the category display screen.

12. The image display apparatus of claim 8, wherein the transition from the contents display screen to the category display screen comprises scrolling from the contents display screen to the category display screen.

13. The image display apparatus of claim 1, wherein the second pressing force is stronger than the first pressing force.

14. The method of claim 7, wherein the second pressing force is stronger than the first pressing force.

15. The image display apparatus of claim 8, wherein the second pressing force is stronger than the first pressing force.

16. The image display apparatus of claim 1, wherein the transition from the contents display screen to the category display screen comprises scrolling from the contents display screen to the category display screen.

17. The image display apparatus of claim 1, wherein the first transient screen displays content items that have not been displayed yet.

18. The image display apparatus of claim 1, wherein the second transient screen displays content items of a selected category.

19. The image display method of claim 7, wherein the first transient screen displays content items that have not been displayed yet.

20. The image display method of claim 7, wherein the second transient screen displays content items of a selected category.

* * * * *